UNITED STATES PATENT OFFICE.

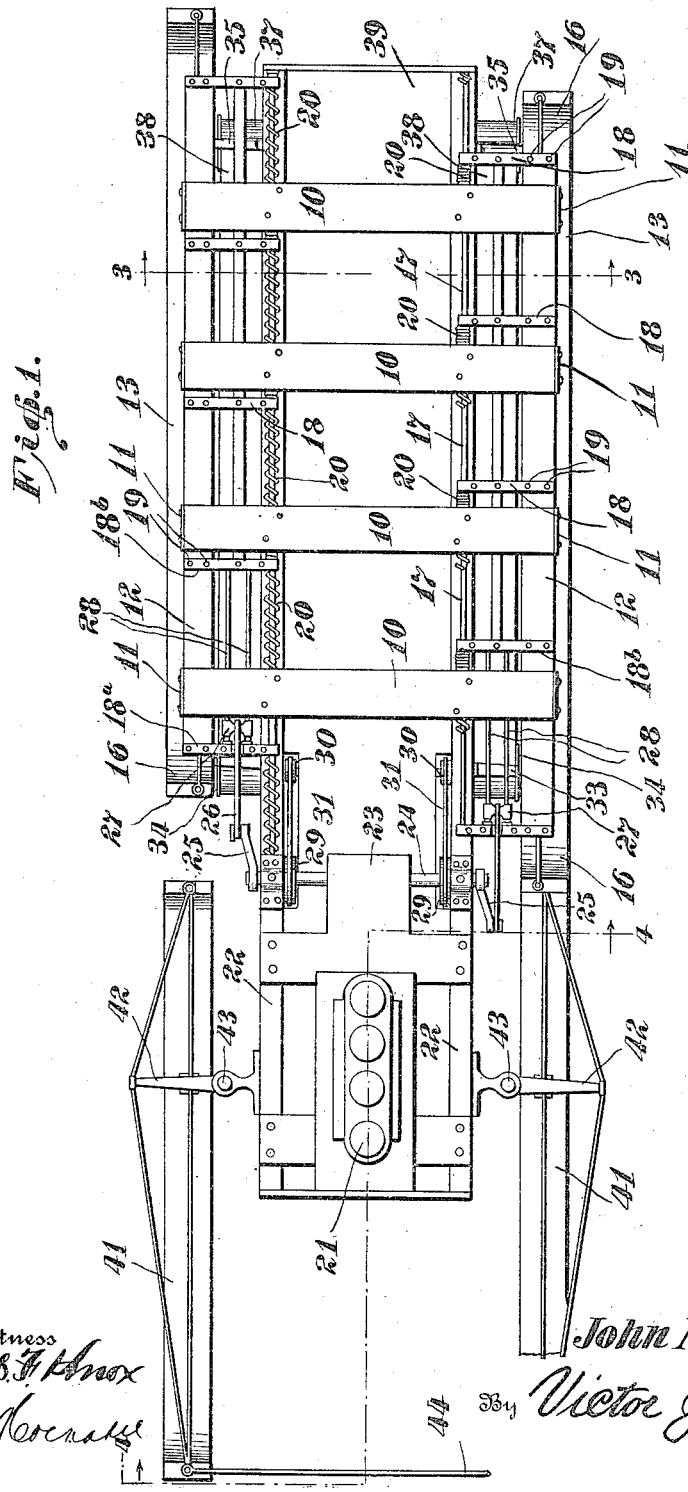

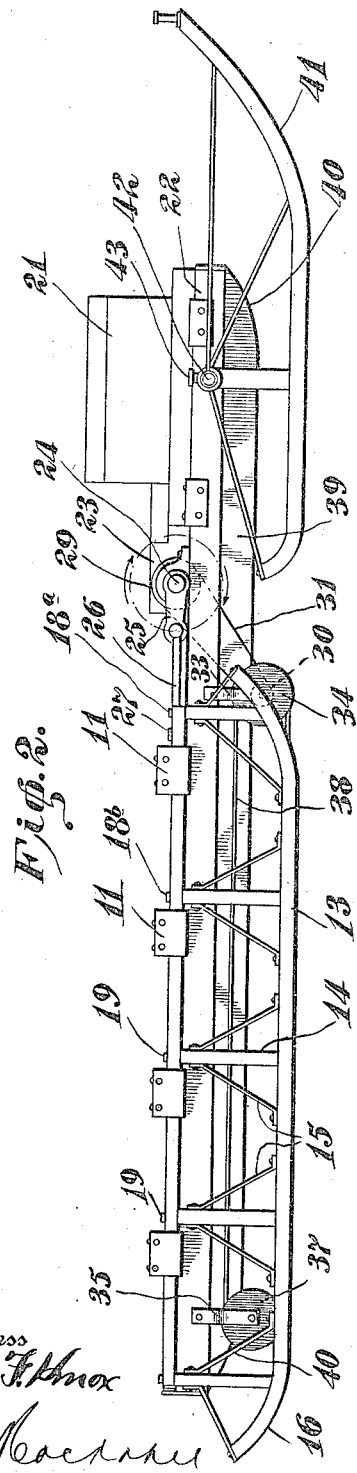
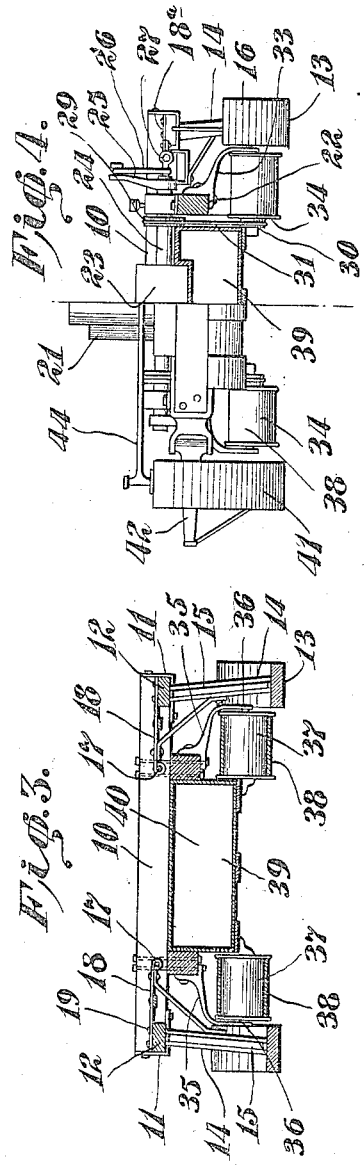

JOHN NAGY GROSS, OF GISCOME, BRITISH COLUMBIA, CANADA.

AUTOSLED.

1,280,444.　　　　Specification of Letters Patent.　　Patented Oct. 1, 1918.

Application filed July 18, 1917.　Serial No. 181,337.

*To all whom it may concern:*

Be it known that I, JOHN NAGY GROSS, a citizen of the United States, residing at Giscome, in the Province of British Columbia and Dominion of Canada, have invented new and useful Improvements in Autosleds, of which the following is a specification.

This invention relates to self propelled vehicles and particularly to means for automatically propelling sleds over the surface of snow and the like.

The object of the invention is to provide a vehicle of the above description which will be automatically driven, and which is provided with means for limiting the depth to which the runners may be sunk in the snow, the said vehicle also being provided with means for maintaining it upon the surface of the water.

Another object of the invention is to provide a motor driven sled which will successfully travel over snow or ice and which is capable of being guided in any direction at the will of the operator.

A still further object of the invention is the provision of a vehicle of this class which is capable of being propelled over hard or soft snow, the said vehicle being also provided with means whereby it is enabled to travel up inclines.

With the above and other objects in view the invention consists of a pair of motor driven alternately operated runners which are adapted to slide in guides carried by the body of the sleigh, means for transferring the motion of these runners to the vehicle, a guiding means and means for limiting the depth at which the runners may sink.

In the drawings;

Figure 1 is a top plan view of a motor driven sled constructed in accordance with the present invention;

Fig. 2 is a side elevation of the same;

Fig. 3 is a transverse sectional view taken on the line 3—3 of Fig. 1; and

Fig. 4 is a similar view taken on the line 4—4 of Fig. 1.

The invention in its practical form comprises a series of transversely extending bars or members 10 to which the sled body (not shown) may be secured. The members 10 are cut away upon the under surface of their outer ends as shown and are provided with angular straps 11, for the purpose of forming slides in which the top bars 12 of the runners 13 are adapted to operate. The runners 13 may be of any preferred construction, the ones shown being provided with the vertically arranged connecting bars 14 and the diagonal braces 15. They are also formed at their ends with the curved portions 16. Mounted within the members 10 are stationary rods 17, which have a sliding connection with the runners 13 by means of the inwardly extending connecting arms 18. The inner ends of these arms are arranged to slide upon the bars 17, while their opposite ends are positively secured to the top bar 12 of the runners 13 as shown at 19. Mounted upon the rods 17 between the members 10 and the arms 18 are coil springs 20, which are adapted to be compressed upon a forward movement of the runners 13 as will be presently apparent.

For the purpose of providing means for operating the runners 13 the sled is provided with a suitable motor 21, which is mounted upon the forward ends of longitudinally extending bars 22 which are secured to the underside of the members 10 between the runners 13. Driven by the motor 21 by means of a suitable transmission located within the casing 23, is a shaft 24 and the outer end of this shaft has secured thereon a pair of oppositely disposed crank arms 25. Pivotally connected to each of these arms is a pitman 26, which carries at its opposite end a cross head 27. Secured between the connecting arms 18$^a$ and 18$^b$, upon each side of the machine, is a pair of longitudinally extending guides 28 and the pitman just described has a sliding engagement with these guides.

Also mounted upon the shaft 24 is a grooved pulley 29, which is connected to a pulley 30 by means of a belt 31, the said pulley 30 being mounted upon a shaft 32 supported by hangers 33 and adapted to drive an air tight drum 34 also carried by the said shaft. Hangers 35 mounted upon the rear end of the drum provide bearings for the shaft 36 upon which is mounted another air tight drum 37. A belt 38 formed of a raw hide band, or other suitable material is adapted to operate over the drums 34 and 37 and as there is one of these belts provided for each of the runners 13, the position of the said belts will serve to limit the depth to which the said runners may be allowed to sink into the snow. Suitable means may be provided for adjusting the height of the belt and means may also be provided for adjusting its length, in order to regulate its length of contact upon the surface of the snow. In addition to providing means for limiting the depth to which the runners will sink, the said belt also provides additional traction means to enable the sled to be propelled up an incline. The length of the belt may be regulated to suit the conditions, for example, a long belt would be more suitable for soft snow, while hard snow would only require a short belt. As shown, the runners are so arranged as to propel the machine in one direction only, but by providing a clutch of suitable form, the direction of operation of the runners may be reversed, to reverse the direction of travel of the sled.

Secured to the underside of the drum is an air tank 39, this tank preferably extending the entire length of the longitudinal members 22 and being formed at each of its ends with curved portions 40. This tank is adapted to provide sufficient buoyancy to maintain the sled upon the surface of the water should it accidentally break through the ice. The tank 40 may be provided with a compartment for the storage of suitable fuel used for operating the motor 21.

For the purpose of guiding the sled there is provided a pair of runners 41, mounted upon horizontal and vertical pivots 42 and 43 for the purpose of providing for the unevenness of the surface over which the sled may travel and for controlling its direction. For the purpose of simultaneously moving the runners 41 in the same direction, they are provided upon their forward ends with a pivoted connecting bar 44. Any suitable steering mechanism for controlling the runners may be employed, and as such steering mechanism forms no part of the present invention there is none shown. Any suitable braking mechanism may be provided for the sled to prevent coasting or retard the progress when desired.

In the operation of the sled, motion is imparted to the shaft 24 by the motor 21, this shaft alternately moving the runners 13 forward by means of their connections to the crank arm, pitman and the cross heads, the forward movement of the pitman carrying forward the runners, while the reverse movement will allow the cross heads to slide freely backward upon the guides 28. As the pitman is moved forward it engages the arm 18$^a$ which carries the runner forward and through this arm and the remaining ones compresses the spring 20. The extension of these springs will cause the body of the sled to move forward and while this is taking place the runner 13 upon the opposite side of the machine is going through the motion just described. It will thus be seen that the runners 13 are alternately operated and that their motion is transferred to the body of the vehicle through the springs 20, causing the said vehicle to move forward.

Various changes in the form and proportion of the invention may be made, for example the belt 31 and the pulleys 39 and 22 may be changed for a sprocket and chain connection. Other changes may be made without departing from the spirit of the invention, and the right is reserved to make such changes.

Having described the invention what I claim, is:

1. A self propelled sled comprising a pair of alternately operated runners, means for operating the said runners, means for transferring motion imparted to said runners to the sled body, guiding means and means for limiting the depth to which the said runners may sink.

2. A self propelled sled comprising a pair of alternately operated runners, means for operating said runners, springs for transferring movements of the runners to the sled, guiding means and means for limiting the depth at which the sled runners may sink.

3. A self propelled sled, comprising a pair of alternately operated runners, means for operating said runners, stationary longitudinal spring supporting rods, springs mounted upon said rods for transferring the movement of the runners to the sled, guiding means and means for limiting the depth to which the said runners may sink.

4. A self propelled sled, comprising body supporting members, runner guides carried by said members, a pair of alternately operated runners, means for operating said runners, means for transferring the movement imparted to said runners to the sled body, guiding means and means for limiting the depth to which the said runners may sink.

5. A self propelled sled comprising a pair of alternately operating runners, means for operating said runners, means for transferring the movement imparted to said runners to the sled body, guiding means, an air tank, and means for limiting the depth to which the said runners may sink.

6. A self propelled sled comprising a pair of alternately operated runners means for operating said runners, means for transferring the movement imparted to the said runners to the sled body, guiding means and belts operated by the said operating means for contact with the surface of the snow.

7. A self propelled sled comprising a pair of alternately operating runners, means for operating said runners, means for transferring the movement imparted to said runners to the sled body, guiding means, air tight drums and belts traveling over said drums to contact with the surface of the snow.

8. A self propelled sled comprising a motor, a driven shaft, oppositely arranged crank arms mounted on said shaft, a pitman connected to each of said crank arms, a pair of runners slidable within guides carried by said sled, means whereby the said pitmen are released from operative engagement with the runners upon the return motion thereof, means for transferring the movement of said runners to said sled, guiding means for limiting the depth to which the runners may sink.

In testimony whereof I affix my signature.

JOHN NAGY GROSS.

Copies of this patent may be obtained for five cents each, by addressing the "Commissioner of Patents, Washington, D. C."